Patented Jan. 13, 1948

2,434,528

UNITED STATES PATENT OFFICE 2,434,528

METHOD FOR REMOVING ASH-FORMING CONSTITUENTS AND SEDIMENT FROM ALKALINE PETROLEUM RESIDUUM

Edward F. Wadley, Baytown, Tex., assignor to Standard Oil Development Company, a corporation of Delaware No Drawing. Application June 4, 1945, Serial No. 597,588

3 Claims. (Cl. 196—38)

The present invention is directed to a process for the treatment of alkaline residua of petroleum.

In most modern refining operations, crude oil is distilled into its various fractions (light and heavy naphtha, gas oil, lube stocks, etc.) in a pipe still which consists of atmospheric and vacuum distillation columns packed with bubble caps. It has been found that the quality of the lube oil cuts which are taken on the vacuum still can be improved when caustic is injected between the atmospheric and vacuum stills. However, this type operation impairs the quality of the fuel oil or residua produced at this unit in that it contains excessive ash and alkalinity and is hence undesirable for good quality fuel production. Many schemes have been attempted for cheaply and successfully reducing the ash and alkalinity of alkaline bottoms, but most of them have not been too successful.

It is desired to produce a fuel having the following tests:

| | |
|---|---|
| Alkalinity | Less than 0.1% by wt. |
| Ash | Less than 0.1% by wt. |
| B. S. & W. | 2% max. (vol.) |
| Sediment | .05% by wt. |

It is the purpose of this invention to provide a process where fuels meeting the above specifications can be produced from alkaline bottoms showing the following tests:

| | Per cent by weight |
|---|---|
| Alkalinity | 0.34 |
| Ash | 0.27 |
| Sediment | 0.05 |

This quality bottoms is usually sent to low grade bunker fuel or burned in the refinery as fuel.

According to the present invention, alkaline bottoms of the aforesaid character are treated with a mixture of water, sulfuric acid and a demulsifying agent at an elevated temperature. The demulsifying agent preferred for use in the present invention is an alkali metal petroleum sulfonate. Generally, a mixture of oil soluble sulfonates and water soluble sulfonates will be employed. The amount of water used may vary from 50% to 150% by volume of the bottoms to be treated. Sulfuric acid of a concentration ranging from about 3 N. to about 10 N. is employed. The amount of sulfuric acid to be employed is determined by the alkalinity of the bottoms to be treated, enough sulfuric acid being used to neutralize the bottoms. The amount of demulsifying agent employed may range from about .05 to .3% by weight of the water.

It has been found that for the successful treatment of these alkaline bottoms the treating agent must contain the three components specified above. No one of these components can be omitted. This will be apparent from the following table in which are compared th especifications of bottoms treated respectively with water and demulsifying agent, with water alone, with water and sulfuric acid and with water, sulfuric acid and demulsifying agent. In the preparation of this data, 400 cubic centimeters of water containing 0.4 gram of petroleum sulfonate (produced by heavily acid treating a phenol extract of a lube oil) and enough 6 N. $H_2SO_4$ to neutralize 400 cc. of fuel oil bottoms of 0.34 alkalinity were added to 400 cc. of the bottoms. The mixture was heated to 150° F. and well agitated. Steam was then injected until the temperature reached 200° F., after which the mixture was allowed to settle. After an 18-hour settling period, the oil layer was withdrawn and tested. The data are summarized as follows:

Table

| Process Description | Tests on Washed Oils | | | |
|---|---|---|---|---|
| | Alkalinity (per cent by wt.) | Ash (per cent by wt.) | Sediment (per cent by wt.) | B. S. & W. (per cent by vol.) |
| Bottoms washed with water and petroleum sulfonate | 0.29 | 0.30 | 0.02 | 1.8 |
| Bottoms washed with water | 0.10 | 0.16 | 0.05 | 6.0 |
| Bottoms washed with water and $H_2SO_4$ | 0.04 | 0.33 | 0.52 | Emulsion |
| Bottoms washed with water and $H_2SO_4$ and petroleum sulfonate | 0.05 | 0.05 | 0.04 | 2.0 |

It will be observed from this table that the only treatment which produced an oil satisfying the specifications heretofore recited was the treatment according to the present invention. It may be observed that each of the other treatments produced an oil which failed to meet the specifications in at least two respects.

The nature and objects of the present invention having been fully described and illustrated, what I wish to claim as new and useful is:

1. A method for treating alkaline petroleum residua obtained by distilling hydrocarbon oil in contact with alkali which comprises mixing said residua with from about 50% to 150% by volume of water, adding only sufficient sulfuric acid of a strength ranging from about 3 N. to about 10 N. to neutralize said residua, adding a petroleum sulfonate in an amount ranging from about .05 to .3% by weight of the water, thoroughly mixing said materials at an elevated temperature, allowing the mixture to settle and stratify and withdrawing the oil layer.

2. A method according to claim 1 in which the petroleum sulfonate is an alkali metal petroleum sulfonate.

3. A method for removing ash-forming constituents and sediment from alkaline petroleum residuum obtained by distilling crude petroleum in the presence of alkali which comprises mixing said residuum with from about 0.5 to about 1.5 volumes of water per volume of residuum, adding sulfuric acid of a strength ranging from about 3 N. to about 10 N. in an amount only sufficient to neutralize the alkalinity of said residuum, adding petroleum sulfonate in an amount ranging from about .05% to .3% by weight of the water, intimately mixing said residuum, water, acid and sulfonate at a temperature between about 125° and 212° F., allowing the mixture to settle and stratify and withdrawing the oil layer.

EDWARD F. WADLEY.

REFERENCES CITED

The following references are of record in the file of this patent:

UNITED STATES PATENTS

| Number | Name | Date |
|---|---|---|
| 2,157,315 | Archibald | May 9, 1939 |
| 1,802,336 | Cook | Apr. 28, 1931 |
| 1,686,491 | Hughes et al. | Oct. 2, 1928 |
| 1,785,242 | Becker | Dec. 16, 1930 |